United States Patent
Nakayama et al.

(10) Patent No.: US 6,272,335 B1
(45) Date of Patent: Aug. 7, 2001

(54) WIRELESS ACCESS SYSTEM

(75) Inventors: Yuji Nakayama; Masahiko Itoh; Satoshi Kurosaki; Satoru Aikawa, all of Tokyo (JP)

(73) Assignee: Nippon Telegraph and Telephone Corp., Shinjuku (JP)

( * ) Notice: Subject to any disclaimer, the term of this patent is extended or adjusted under 35 U.S.C. 154(b) by 0 days.

(21) Appl. No.: 09/034,945

(22) Filed: Mar. 5, 1998

(30) Foreign Application Priority Data

Mar. 5, 1997 (JP) .................................................. 9-050693
Mar. 14, 1997 (JP) .................................................. 9-060980

(51) Int. Cl.$^7$ ...................................................... H04Q 7/20
(52) U.S. Cl. .......................... 455/422; 455/432; 455/434; 455/450; 455/561; 455/562
(58) Field of Search ...................................... 455/561, 562, 455/6.1, 434, 450, 151.2, 179.1, 277.1, 277.2, 278.2, 422; 370/334, 337, 272

(56) References Cited

U.S. PATENT DOCUMENTS

| | | | |
|---|---|---|---|
| 4,775,999 | * 10/1988 | Williams | 379/59 |
| 5,740,166 | * 4/1998 | Ekemark et al. | 370/331 |
| 5,774,790 | * 8/2000 | Dupuy | 455/452 |
| 5,790,606 | * 8/1998 | Dent | 375/348 |
| 5,809,431 | * 9/1998 | Bustamante et al. | 455/562 |
| 5,884,181 | * 8/2000 | Arnold et al. | 455/450 |
| 5,905,957 | * 5/1999 | Olds | 455/435 |
| 6,097,970 | * 8/2000 | Angus et al. | 455/562 |
| 6,148,219 | * 11/2000 | Engelbrecht et al. | 455/562 |
| 6,154,661 | * 11/2000 | Goldburg | 455/562 |

FOREIGN PATENT DOCUMENTS 637180 2/1995 (EP) .
96/37969 11/1996 (WO) .

\* cited by examiner

Primary Examiner—Daniel Hunter
Assistant Examiner—Yemane Woldetatios
(74) Attorney, Agent, or Firm—Pillsbury Winthrop LLP

(57) ABSTRACT

In a wireless access system which uses the sector antenna of a radio base station to transmit an access channel to and receive an access channel from a radio terminal in each frame, and which switches the sector at each frame, the sector ID s is set in a specific functional relation to the access channel ID a, and a radio terminal which communicates with a radio base station transmits and receives in accordance with the access channel ID a without knowing the sector ID s.

13 Claims, 10 Drawing Sheets

| Ach ID | Sector ID for transmitting downlink Ach | Sector ID for receiving uplink Ach |
|---|---|---|
| 0 | 0 | 0 |
| 1 | 1 | 1 |
| 2 | 2 | 2 |
| 3 | 3 | 3 |
| 4 | 4 | 4 |
| 5 | 5 | 5 |
| 6 | 0 | 0 |
| 7 | 1 | 1 |
| 8 | 2 | 2 |
| 9 | 3 | 3 |
| 10 | 4 | 4 |
| 11 | 5 | 5 |

| Ach ID | Sector ID for transmitting downlink Ach | Sector ID for receiving uplink Ach | |
|---|---|---|---|
| 0 | 0 | 0 | |
| 1 | 1 | 1 | |
| 2 | 2 | 2 | |
| ③ | 3 | ③ | Ach for uplink reception (Terminal Mi) |
| 4 | 4 | 4 | |
| 5 | 5 | 5 | |
| 6 | 0 | 0 | |
| 7 | 1 | 1 | |
| 8 | 2 | 2 | |
| ⑨ | ③ | 3 | do not respond |
| 10 | 4 | 4 | |
| 11 | 5 | 5 | |
| 0 | 0 | 0 | |
| 1 | 1 | 1 | |
| 2 | 2 | 2 | |
| ③ | ③ | 3 | respond to Terminal Mi |
| 4 | 4 | 4 | |
| ⋮ | ⋮ | ⋮ | |

FIG.8

| Ach ID (downlink) | Sector ID for transmitting downlink Ach | Ach ID (uplink) | Sector ID for receiving uplink Ach |
|---|---|---|---|
| 0 | 0 | 11 | 5 |
| 1 | 1 | 0 | 0 |
| 2 | 2 | 1 | 1 |
| 3 | 3 | 2 | 2 |
| 4 | 4 | 3 | 3 |
| 5 | 5 | 4 | 4 |
| 6 | 0 | 5 | 5 |
| 7 | 1 | 6 | 0 |
| 8 | 2 | 7 | 1 |
| 9 | 3 | 8 | 2 |
| 10 | 4 | 9 | 3 |
| 11 | 5 | 10 | 4 |

WIRELESS ACCESS SYSTEM

BACKGROUND OF THE INVENTION

The present invention claims priority from Japanese Patent Applications No. 9-050693 filed Mar. 5, 1997 and No. 9-060980 filed Mar. 14, 1997, which are incorporated herein by reference.

1. Field of the Invention

This invention is utilized in radio communications using time division multiple access (TDMA), and is suited for use in mobile communications and wireless LANs which make in-building use of portable radio terminals.

2. Description of Related Art

Demand for high-speed wireless access communications has recently been increasing, and TDMA is one of the principal access systems in this field. Sector antennas are utilized for high-speed wireless access communications in order to suppress multipath interference and obtain efficient frequency utilization. A sector antenna is an antenna which, by using a plurality of directional antennas, is capable of communicating with stations in all directions. In an access system which uses sector antennas, a radio base station successively switches among its sector antennas, thereby transmitting an access channel in all directions covered by the plurality of directional antennas. If TDMA is employed, the sector is switched over at every TDMA frame.

A problem here is that with a high-speed wireless access system, the optimum value for the number of sectors or the number of branches of a radio base station sector antenna differs according to the base station installation environment or radio wave propagation environment. However, if the number of sectors or branches is different at each radio base station, then when a radio terminal communicates with any of a plurality of radio base stations it will have to do so while referring to information on the relation between the method by which the radio base station selects the frequency and which antenna sector to use to transmit the access channel, and the number of sectors used for its transmission. However, when a high-speed wireless access system is implemented with a large number of installed radio base stations, it is difficult to ensure that a radio terminal holds separate information for all these base stations. Even if this is assumed to have been possible, it would still be more difficult to update this information each time the number of installed radio base stations is changed or their specifications are altered. There is therefore a need for a method capable of synchronizing flexibly against changes in the number of sectors used at a radio base station for transmission over the access channel, without holding any information at the radio terminal.

High-speed wireless access systems which involve dividing zones into pico-cells and installing a large number of radio base stations have been studied. However, an additional problem in this case is that access channels from a plurality of radio base stations are frequently received at one radio terminal. Namely, there are a plurality of radio carrier frequencies and the same radio carrier frequency is sometimes used by a plurality of radio base stations. Moreover, because a radio base station uses a sector antenna to transmit the access channels, a plurality of access channels which have been transmitted from one radio base station using different sectors will sometimes arrive at a radio terminal. That is, a radio terminal will sometimes receive the access channel from a plurality of base stations, at a plurality of frequencies or timings, or from a plurality of directions. It is then necessary for the radio terminal to switch among the radio carrier frequencies and sectors it receives, and to select from these the ones giving the best quality access channel. Hitherto, however, there has been no method for selecting the optimum access channel from among the plurality of access channels received by switching among the radio carrier frequencies and sectors the radio terminal receives, and for establishing synchronization on this basis.

SUMMARY OF THE INVENTION

It is an object of the present invention to provide a wireless access system capable of successfully addressing such tasks, and whereby a radio terminal can perform identical communication control in a variety of circumstances such as acquisition of synchronization and duration of communication, irrespective of the configuration of the radio base station antenna.

Namely, according to a first aspect of the present invention there is provided a radio channel control method which controls a plurality of antenna elements at a radio base station to transmit an access channel to and receive an access channel from a radio terminal in each frame. The method includes setting the antenna element ID s in a specific functional relation to the access channel ID a, wherein a radio terminal which communicates with a radio base station transmits and receives in accordance with the access channel ID a without knowing the antenna element ID s. Here, "an individual antenna element" signifies an individual sector of a sector antenna, or each of a plurality of antennas provided for diversity.

The access channel ID is an integer which cycles from "0" to "N−1", and the number of antenna elements of a base station is preferably a divisor of N.

That is, although when using a sector antenna at a radio base station the number of sectors can be set freely, if the number of sectors is made a divisor of N, the base station can transmit and receive access channels uniformly in all directions.

It is also possible to give respective IDs to the uplink and downlink access channels and for these IDs to have the same functional relation to the antenna element ID, and for their cycling phase to differ. Namely, by ensuring that the cycling of the uplink access channels is out of phase with the cycling of the downlink access channels, a processing delay at a radio base station or a radio terminal can be absorbed by this offset in cycling phase. For example, a result of this is that after a radio terminal detects a downlink access channel it can transmit an uplink access channel with the minimum delay. Rapid connection and communication are therefore possible.

According to a second aspect of the present invention, there is provided a wireless access system having a radio base station and a radio terminal which can be connected to this radio base station by TDMA. The radio base station includes a plurality of antenna elements and means for transmitting and receiving an access channel in each frame and a means which, letting the access channel ID be a and the antenna element ID be s, sets:

$$s = f(a)$$

(where f indicates a specific functional relation).
The radio terminal comprises a means for communicating with the radio base station in accordance with this access channel ID a.

A sector antenna can comprise a plurality of antenna elements, and a plurality of these sector antennas can be provided at a radio base station. A diversity means can also be provided for the plurality of sector antennas at the radio base station.

A radio terminal preferably comprises: a sector antenna having a transmitting and receiving azimuth which is switched among a plurality of azimuths at each frame and a means for switching the transmit and receive frequency every time the sectors of this sector antenna are switched through a complete cycle. The radio terminal further comprises an open aperture means which successively looks for a unique word in the received signal at all time, and synchronizing means which, when the unique word in question has been detected by the open aperture means, subsequently attempts to confirm synchronization a predetermined number of times. As a result, the channel with the best communication quality can be selected rapidly and reliably from among a plurality of access channels.

A radio terminal preferably also comprises a means for randomly switching the transmit and receive frequency until synchronization is established. This facilitates avoids the situation where, when a plurality of radio terminals are present, a large number of terminals establish synchronization at the same frequency impartially.

A radio terminal preferably comprises a selection means which, even if the unique word in question is detected by the open aperture means, defers establishing synchronization until it has cycled through all the combinations of the antenna sectors and transmit and receive frequencies, and which establishes synchronization for the combination which gives the best received or transmitted signal quality during this cycling. As a result, given a plurality of access channels to which the radio terminal could be synchronized, synchronization can be established with the channel which can guarantee the best communication quality.

The selection means can comprise means for recording the communication quality of each of the combinations, or it can comprise means for recording the combination which gives the best transmission quality.

The selection means can also comprise means which determines the access channel with the best communication quality in accordance with the contents recorded by the recording means, and which performs open aperture processing again for this access channel. This re-application of open aperture processing deals with the situation in which the synchronization of an initially received access channel has drifted because the accuracy of the system clock between the base station and the terminal might not be sufficient.

BRIEF DESCRIPTION OF THE DRAWINGS

FIG. 8 illustrates how a radio base station responds to a radio terminal with a downlink access channel.

DETAILED DESCRIPTION OF PREFERRED EMBODIMENTS

Figure 1:
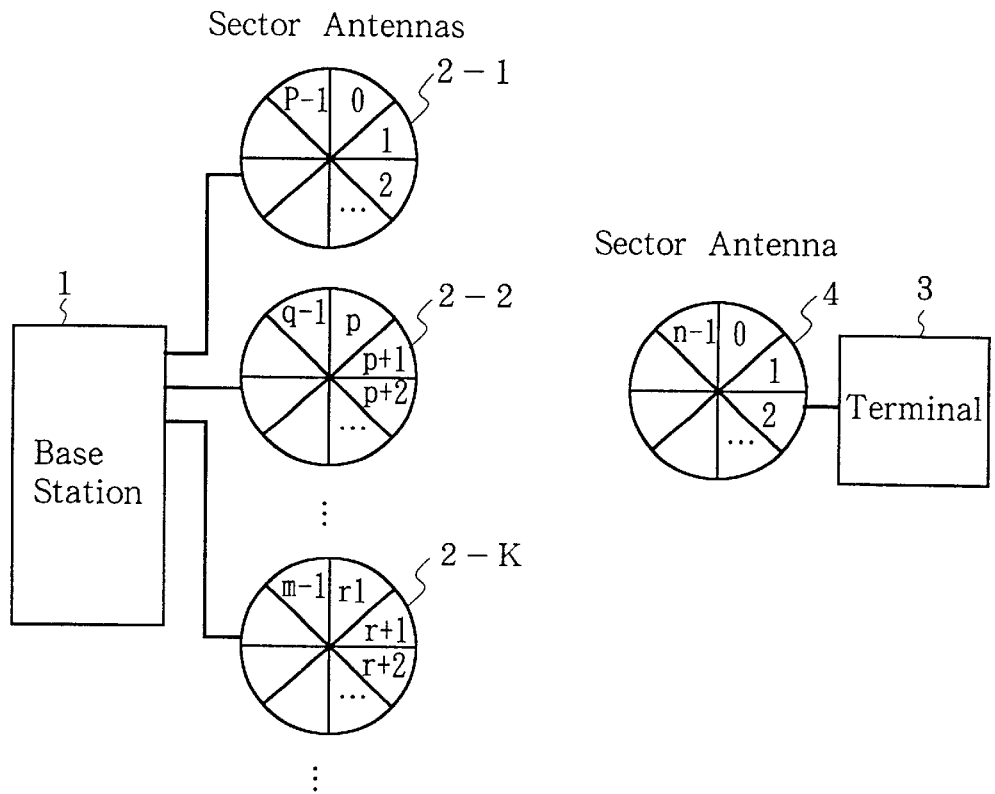
FIG. 1 shows the fundamental configuration for implementing the present invention.

FIG. 1 illustrates the fundamental configuration for implementing the present invention, showing radio base station 1, radio terminal 3, and respectively provided sector antennas 2-1 to 2-$k$ and 4. It will be assumed here that radio base station 1 is provided with a plurality of sector antennas 2-1 to 2-$k$ for diversity control. The numbers of sectors of each sector antenna 2-1 to 2-$k$, namely p, q–p, . . . , m–r, can be equal to one another or can differ.

Radio base station 1 uses sector antennas 2-1 to 2-$k$ to transmit a downlink access channel to and receive an uplink access channel from a radio terminal in each frame, and at each frame it switches the sector. Namely, it successively switches through sectors #0 to #m−1 frame by frame, thereby switching through all the antenna branches constituted by the plurality of sector antennas. To perform this switching, it sets sector ID s in a specific functional relation to access channel ID a. Namely, letting the access channel ID be a and the sector ID of the sector antenna be s, it sets:

$$s = f(a)$$

(where f indicates a specific functional relation).

Radio terminal 4, which communicates with radio base station 1, transmits and receives in accordance with access channel ID a without knowing the sector ID s.

Figure 2:
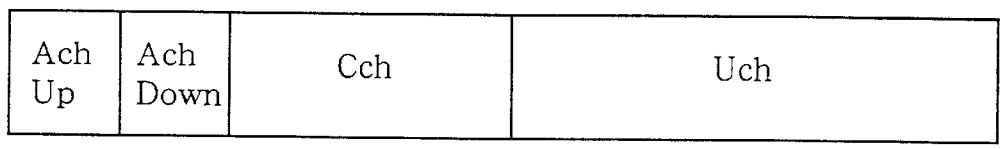
FIG. 2 shows an example of a TDMA frame format.
Figure 3:
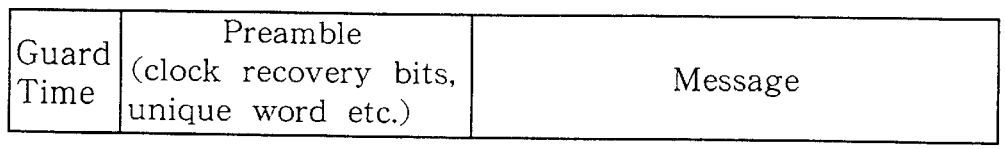
FIG. 3 shows the format of an access channel.

An example of a TDMA frame format is shown in FIG. 2. This frame comprises access channels (Ach), control channels (Cch) and user channels (Uch). There is a plurality of control channels in each frame and each of them corresponds to the radio terminal. There is a plurality of user channels in each frame and the required number of channels are assigned to each radio terminal. There is one uplink and one downlink access channel per frame, and these are shared by all radio terminals in the process of connecting to a radio base station. The access channels serve for the exchange of preliminary information, control channel assignment information, etc. An access channel format is shown in FIG. 3. An access channel comprises guard time, clock recovery bits, a unique word and a message. The preliminary information, control channel assignment information, etc., are entered in the message area.

The design of synchronization control (timing control) is an important topic of study in TDMA, and the method generally employed has been to control timing using a unique word in the access channel. Namely, when a radio terminal attempts to synchronize with a radio base station, it initially performs an open aperture based unique word detection. If the unique word is detected, the open aperture detection is discontinued and for subsequent frames the terminal performs a narrow aperture based unique word detection in the vicinity of the relative detection timing in the frames. Synchronization is deemed to be established when the narrow aperture unique word detection has been confirmed a predetermined plural number of times. Here, "open aperture" signifies a unique word detection scheme which deems the unique word detection to be valid at any time, while "narrow aperture" signifies a unique word detection scheme which, in order to suppress false unique word detection, deems the unique word detection in subsequent frames to be valid only if the timing is within a few symbols of the timing in the subsequent frame which corresponds to the timing at which the unique word was detected by the open aperture processing.

The present embodiment modifies this unique word detection scheme so that when preliminary information has been received in access channels from a plurality of base stations and directions and at a plurality of frequencies and timings, synchronization is established after selecting the channel with the best quality. Namely, radio terminal 3 performs open aperture based unique word detection while switching cyclically through the sectors of sector antenna 4. When a unique word is detected and the communication quality is above a predetermined threshold (received power, number of error bits, etc., or a combination of these), the unique word has been detected a prescribed number of times in subsequent successive frames in order to avoid false synchronization and then synchronization thereby established. In order to synchronize to the best quality channel, radio terminal 3 uses a given sector and scans the access channels during the periods when they are being transmitted by base stations, and if it detects an access channel of good quality it stores its timing and received quality in memory, along with the sector used. After the same processing is performed for all sectors, the terminal synchronizes to the access channel with the best received quality.

Figure 4:
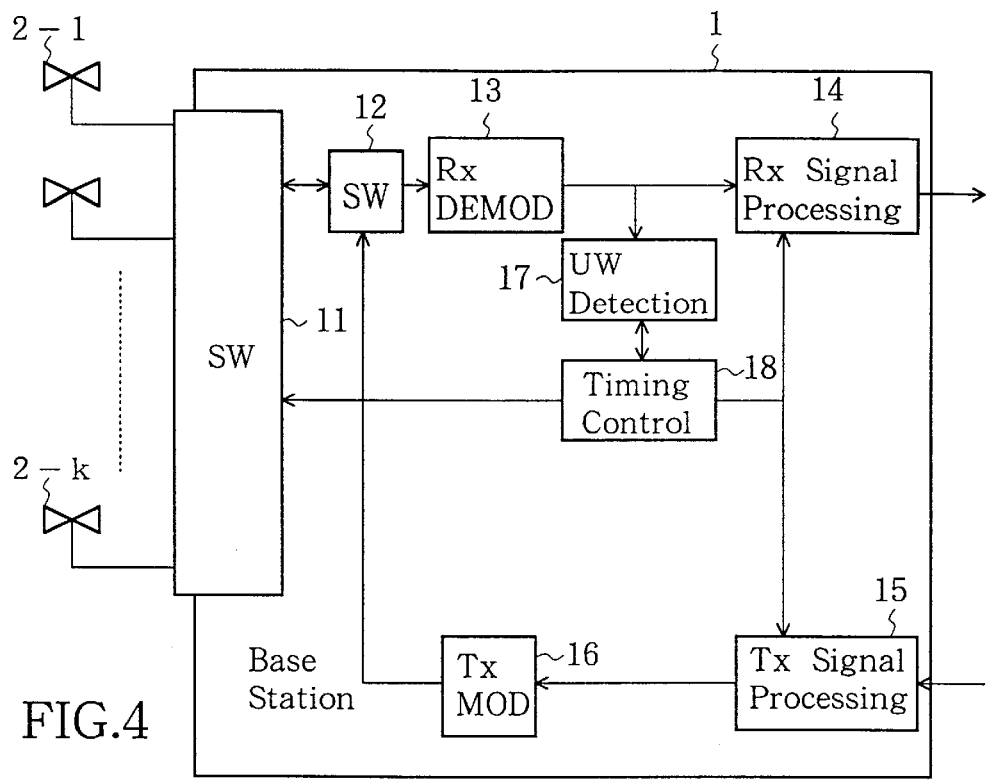
FIG. 4 shows a detailed example of the configuration of a radio base station.
Figure 5:
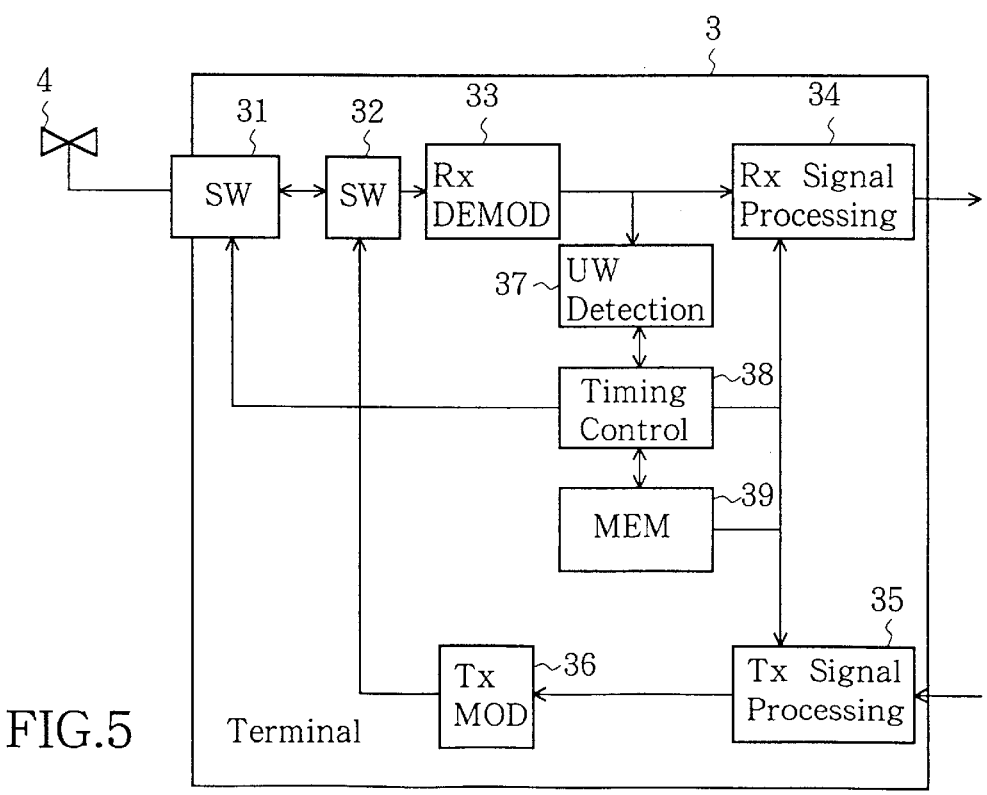
FIG. 5 shows a detailed example of the configuration of a radio terminal.

FIG. 4 and FIG. 5 give detailed examples of the configuration of radio base station 1 and radio terminal 3.

Radio base station 1 comprises: antenna switch 11 for switching among the plurality of sector antennas 2-1 to 2-$k$ and their sectors; switch 12 for switching between transmit and receive modes; receiving demodulator unit 13 to which the received signal is supplied via antenna switch 11 and switch 12, and which detects and demodulates this received signal; received signal processing unit 14 which processes the output of receiving demodulator unit 13; transmission signal processing unit 15 which processes the signal to be transmitted to each radio terminal; transmission modulating unit 16 which modulates the output of this transmission signal processing unit 15 and outputs it to the antenna side via switch 12; unique word detection unit 17 for detecting the unique word in the output of receiving demodulator unit 13; and timing control unit 18 which controls the operation timing of antenna switch 11, received signal processing unit 14 and transmission signal processing unit 15 in accordance with its system clock and the timing of the detection output of the unique word detection unit 17.

Radio terminal 3 similarly comprises: antenna switch 31 for switching among the sectors of sector antenna 4; switch 32 for switching between transmit and receive modes; receiving demodulator unit 33 to which the received signal is supplied via antenna switch 31 and switch 32, and which detects and demodulates this received signal; received signal processing unit 34 which processes the output of receiving demodulator unit 33; transmission signal processing unit 35 which processes the signal to be transmitted to the radio base station; transmission modulating unit 36 which modulates the output of the transmission signal processing unit 35 and outputs it to the antenna side via switch 32; unique word detection unit 37 for detecting the unique word in the output of receiving demodulator unit 33; timing control unit 38 which controls the operation timing of antenna switch 31, received signal processing unit 34 and transmission signal processing unit 35 in accordance with the detection output of this unique word detection unit 37; and memory 39 for storing information required for timing control.

Figures 6, 7:
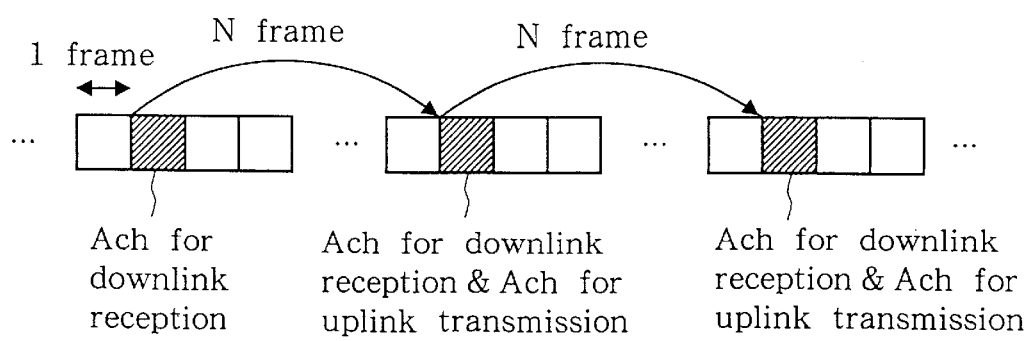
FIG. 6 shows a correspondence between access channel ID and sector ID at a radio base station.
FIG. 7 illustrates access channel transmit and receive control at a radio terminal.

The working of sector switching will be explained with reference to FIG. 6 to FIG. 8. FIG. 6 shows a correspondence between access channel ID and sector ID at a radio base station. FIG. 7 illustrates access channel transmit and receive control at a radio terminal. FIG. 8 illustrates how a radio base station responds to a radio terminal with a downlink access channel.

If the access channel ID period is N (where N is a natural number), the number of sectors for transmission of the access channel from a radio base station is m (where m is a natural number equal to or less than N), and a sector ID from 0 to m−1 is given to each sector (see FIG. 1), at each frame, the radio base station changes the access channel ID within the range 0 to N−1, and in correspondence with this changes the sector from #0 to #m−1. The radio base station successively transmits and receives access channels on this basis.

FIG. 6 shows, for example, the case where the sector ID s is determined by:

$$s = a \bmod m \qquad (1)$$

where a is the access channel ID, and in particular where the access channel ID period is 12 and the number of sectors for transmitting the access channel is 6. Note that the expression x mod y expresses the remainder when x is divided by y. In this example, a cycle consisting of sector IDs 0, 1, 2, 3, 4 and 5 is repeated twice in twelve frames. FIG. 6 shows one period of access channel IDs (12 frames).

If Equation 1 is used as the functional relation, equal use of all sectors for transmission is possible if the number of sectors for transmitting the access channel is a divisor of the access channel period. Namely, even in cases where due to differences in radio wave propagation environment or installation location (outdoors, indoors, etc.) the number of sectors for transmitting the access channel is different for each radio base station, equal use of all the sectors for transmission can be achieved by making the number of sectors a divisor of the access channel ID period.

Another function can also be considered for deriving the sector ID s. Namely, instead of Equation 1, the sector ID s can be determined by:

$$s = a \operatorname{div}(N \operatorname{div} m) \qquad (2)$$

where the expression x div y expresses the integer quotient when x is divided by y (the remainder being discarded). When the access channel ID period is 12 and the number of sectors for transmitting the access channel is 6, the sector IDs used to transmit the access channel will be a repetition of: 0, 0, 1, 1, 2, 2, 3, 3, 4, 4, 5, 5. In the case of Equation 2 as well, equal use of all sectors for transmission is possible if the number of sectors for transmitting the access channel is a divisor of the access channel ID period.

Alternatively, any desired repetition pattern can be set as follows. Namely, instead of using a computational formula such as Equation 1 or Equation 2 as a function, a sector ID s can be set in advance for each value of the access channel ID a, and these preset IDs can be stored in memory. Then, in operation, the stored contents can be read from memory.

Although any desired pattern of access channel downlink transmission can thus be selected by a radio base station, a radio terminal can receive under uniform control without having to detect each time what transmission pattern is being employed. Namely, radio base station may sometimes transmit an access channel a plurality of times from the same sector in N frames, but even if a radio terminal performs control which enables it to receive a plurality of access channels in an N frame period, it will acquire synchronization and transmit and receive in respect of only one of these access channels.

When a radio terminal transmits an uplink access channel, it does so in the N-th frame after a frame in which it received a downlink access channel, as shown in FIG. 7. The control performed by a radio terminal during synchronization and communication has a period of N frames irrespective of the number of sectors which a radio base station uses to transmit an access channel.

In order for a radio terminal to receive only every N frames, the radio base station transmits a downlink access channel for responding to the radio terminal in a frame with the same access channel ID as the frame in which it received the uplink access channel. As shown in FIG. 8, even though the sector ID is the same, the radio base station does not transmit a response in a frame where the access channel ID is different. FIG. 8 shows the situation when a=3.

If processing takes longer than a certain time after a radio terminal has received a downlink access channel, it becomes impossible for that radio terminal to transmit an uplink access channel in the same frame, which means that it transmits after waiting for N frames. Therefore, rapid communication is impossible. A way to remedy this is to use the same pattern for cycling through the uplink and downlink access channel IDs at the radio base station, but to ensure that the two cycles are out of phase by a few frames. An example of the correspondence between access channel ID and sector ID in this case is given in FIG. 9.

Using this method, a radio terminal can transmit in an uplink access channel after k frames by setting:

$au=ad-k$ (when $ad \geq k$)

Figures 9, 10:
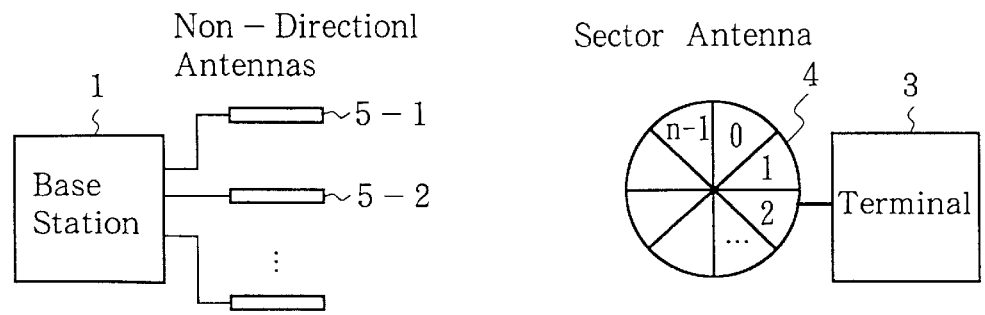
FIG. 9 shows an example of the correspondence between access channel ID and sector ID.
FIG. 10 shows an example of the configuration when a non-directional antenna is used at a radio base station.

$=ad-k+N$ (when $ad<k$) (3)

where in a given frame ad is the downlink access channel ID, au is the uplink access channel ID, and k is a natural number which is less than N, and by setting:

$sd=f(ad)$ $su=f(au)$ (4)

where su is the uplink sector ID and sd is the downlink sector ID. FIG. 9 shows an example in which N=12, m=6, k in Equation 3 is given by k=1, and Equation 1 is used in Equation 4.

The foregoing explanation concerned the case where a directional sector antenna was used as the radio base station antenna, but the present invention can also be exploited if a non-directional antenna is used at the radio base station. An example of a configuration for this case is shown in FIG. 10. In this example, non-directional antennas 5-1, 5-2, . . . are provided at radio base station 1. In this case, the ID of the antenna used to transmit the access channel is utilized instead of the ID of the sector used for access channel transmission.

Whereas the forgoing explanation is mainly concerned with sector switching at a radio base station, an explanation will now be given of synchronization control at the radio terminal side.

Figure 11:
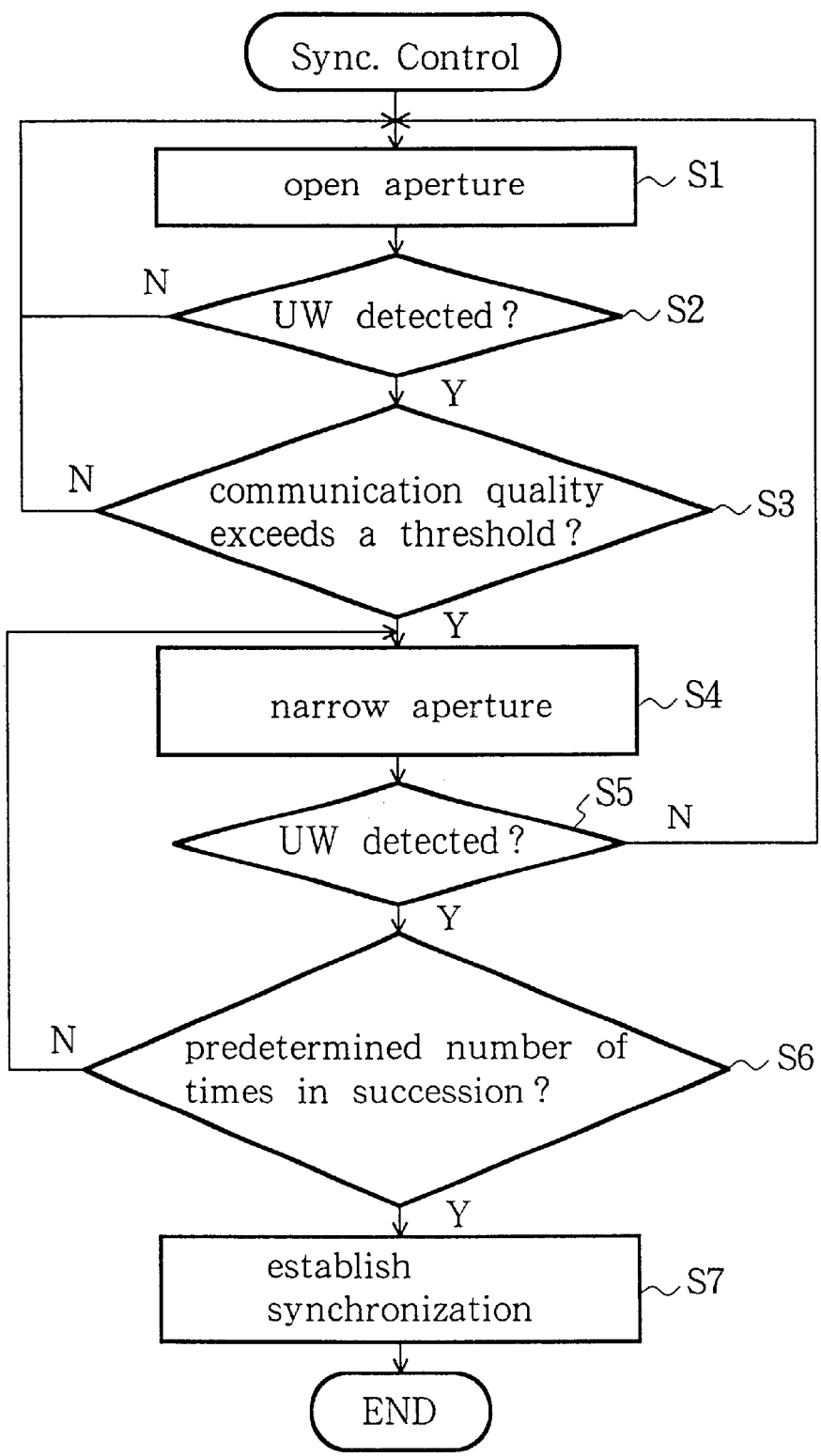
FIG. 11 is a flowchart of an example of synchronization control.

FIG. 11 is a flowchart giving an example of synchronization control. In this example it is assumed that synchronization is established on the basis of the initially detected access channel. The number of antenna branches at a radio base station is defined k and it is assumed that the number of sectors in each branch is the same, namely p (i.e., p=q=p= . . . =m−r). Further, the number of sectors of the radio terminal antenna is n and it is assumed that a number is given to each sector. Note that an access channel is not necessarily transmitted from all the sector antennas of the radio base station and that sometimes the transmission will involve specific branches only. Here we shall consider only the branches and sectors which transmit an access channel.

The radio terminal uses the open aperture technique to look for the unique word in the access channel, using sector #0 and operating at a certain radio carrier frequency, and maintaining this open aperture detection for a time equal to or longer than: (k×p frames)+(unique word length [symbols])−1 [symbol] (S1). If no unique word can be detected with sector #0, the same processing is performed with sector #1. If once again no unique word can be detected and the same processing is performed successively up to sector #n−1 and in each case no unique word is detected, the same control is performed after changing the radio carrier frequency. If no unique word is detected at any of the radio carrier frequencies, out-of-range processing is performed and open aperture processing is applied again starting from sector #0.

If each of a plurality of radio terminals starts its open aperture processing using the same radio carrier frequency, the result will be a concentration of radio terminals performing synchronization control at that frequency, thereby causing problems such as interference and reduced throughput. An effective solution is therefore to select a radio carrier frequency randomly at each radio terminal. The order in which frequencies are selected can be changed on the basis of random number generation or in accordance with a value such as the time at which the synchronization processing started. Alternatively, the order in which frequencies are selected can be changed in accordance with the serial number of the radio terminal.

When the open aperture processing results in the detection of a unique word of an access channel (S2), if the communication quality of the access channel containing this unique word exceeds a threshold (S3), a narrow aperture unique word detection is performed after k×p frames (S4). If a unique word is detected by the narrow aperture processing (S5) and if the unique word is detected a predetermined number of times in succession (S6), synchronization is deemed to be established (S7). If no unique word is detected by the narrow aperture processing, the process starts again from the beginning.

In embodiments of the present invention, synchronization of the access channel is acquired by taking communication quality into consideration. Communication quality is compared with a threshold for one or more criteria such as:

1. received level
2. number of error corrected bits
3. CRC error detection
4. pseudo-error pulses.

The following are the explanations of each criterion:

1. A threshold for a received level is provided, an access channel with the received level below this threshold is discarded, and one with the received level above the threshold is adopted.
2. In the case of the number of erroneous bits, if bit errors have been corrected, a threshold is provided for the number of bits where a bit error was detected and corrected in the message area of the access channel in which a unique word was detected, and an access channel in which the number of erroneous bits exceeds this threshold is discarded, while one in which the number is below the threshold is adopted.

3. In the case of CRC error detection, if a cyclic redundancy check (CRC) has been carried out and an error is detected in the message area of an access channel in which a unique word was detected, that access channel is discarded, while if no CRC error is detected the access channel is adopted.

4. In the case of pseudo-error pulses, a pseudo-error pulse generator is provided and a threshold set for the number of pseudo-error pulses counted in the access channel in which a unique word has been detected. If this threshold is exceeded the access channel is discarded, while if the number of pseudo-error pulses is below the threshold the access channel is adopted. Here, "pseudo-error pulse" signifies a pulse generated in accordance with phase information prior to data decision in the digital demodulator, when the distance from the decision point in the signal space is large, even when there is actually no bit error.

If non-directional antennas are used as the radio base station antennas, the same treatment is possible by taking the number of sectors of the radio base station sector antennas as 1.

Next, an explanation will be given with reference to FIG. 12 to FIG. 14 of three examples of synchronization control in which synchronization is established on the basis of the access channel which, of all the detected access channels, offers the best communication quality.

Figure 12:
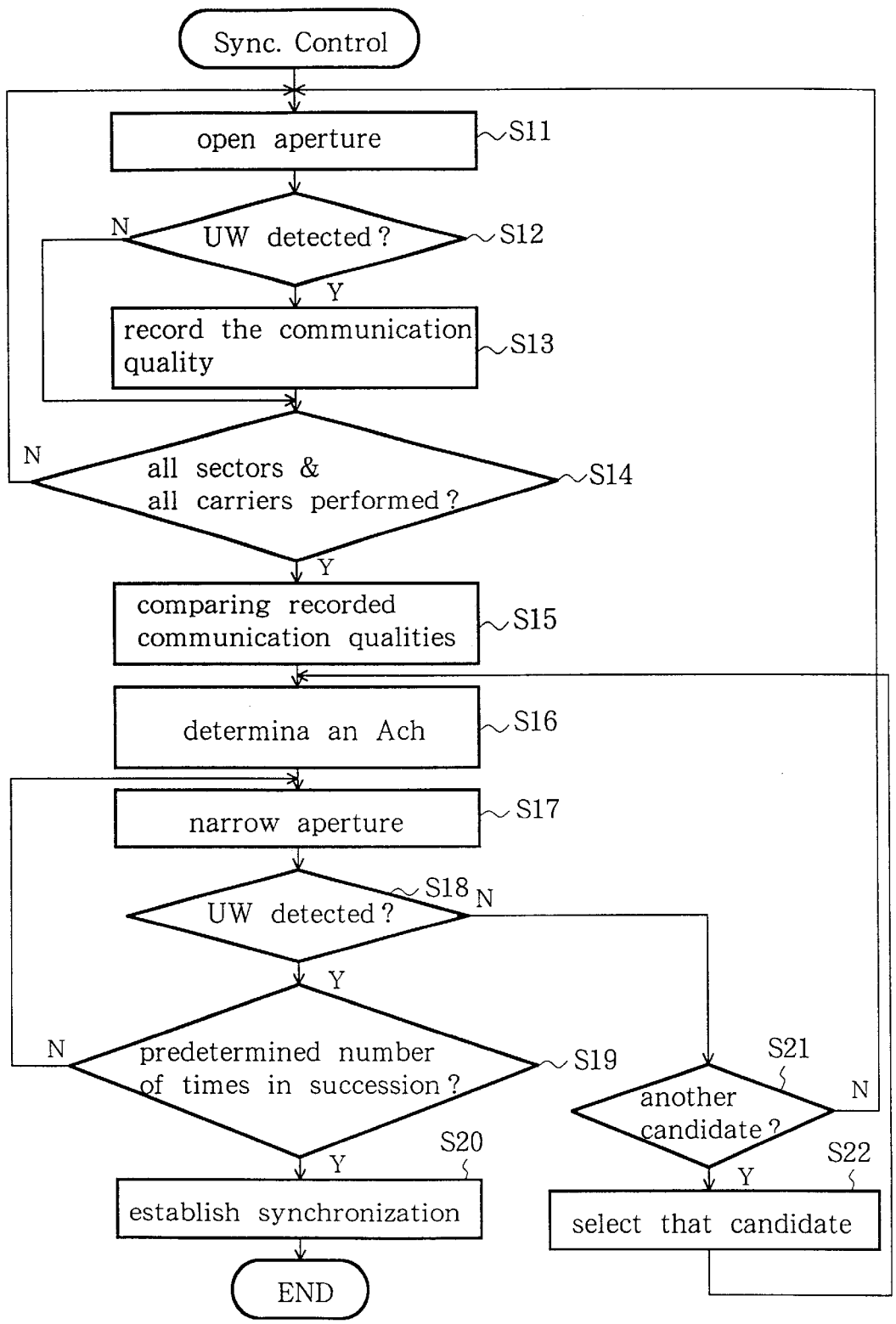
FIG. 12 is a flowchart of another example of synchronization control.

The synchronization control shown in FIG. 12 is the same as the control illustrated in FIG. 11 up to the point where the open aperture unique word detection begins (S11, S12). When a radio terminal has detected a unique word on the basis of the open aperture processing, its communication quality is recorded in memory along with its timing and receiving sector information (S13). This open aperture processing is performed while switching among all the sectors and all the radio carrier frequencies (S14) and in each case the communication quality is recorded in memory along with the timing and receiving sector information (S13).

If all the open aperture unique word detections have been completed and a plurality of access channel candidates have been detected, the radio terminal performs a narrow aperture and subsequent processing on the access channel with the best communication quality. Namely, the radio terminal refers to the memory and compares the recorded communication quality of the plurality of access channel candidates (S15). The access channel with the best communication quality is selected and taken as the access channel in relation to which synchronization will be established (S16). Narrow aperture processing is performed on this access channel (S17) and if the unique word is detected a predetermined number of times (S18, S19), synchronization is deemed to be established (S20).

If the narrow aperture detection fails for the access channel with the best communication quality, the memory is referred to again and if there is another candidate (S21), that candidate is selected (S22) and the narrow aperture processing is performed again (S17 to S20). If there is no other candidate, the process flow begins again from the application of open aperture processing (S11). The candidate with the best communication quality is taken as the first candidate, and second and third candidates with second-best and third-best communication quality may also be defined. The number of candidates for the narrow aperture processing can be set as desired.

How good communication quality is can be judged in accordance with the following criteria, or in accordance with a composite of these:

1. received level (judged on the basis of the magnitude of the received level value or its relation to a threshold)
2. number of error corrected bits (judged on the basis of the number of bits or its relation to a threshold)
3. number of bits which do not match the unique word (judged on the basis of the number of bits)
4. CRC error detection (whether an error is detected by CRC)
5. pseudo-error pulses (judged on the basis of the number of pulses or their relation to a threshold).

The significance of "composite" is that if, for instance, the application of a certain criterion returns the same value, then the quality of communication is judged using another criterion. Namely:

1. In the case of received level, the quality of communication is judged on the basis of the magnitude of the received level. Alternatively, a threshold is provided and an access channel below the threshold is discarded, while a channel exceeding it is adopted.
2. In the case of number of error corrected bits, if a bit error correction function has been provided, the quality of communication is judged on the basis of the number of bits which have been corrected after detection of a bit error in the message area of the access channel in which a unique word was detected. Alternatively, a threshold is provided and an access channel for which the number of error corrected bits exceeds the threshold is discarded, while an access channel for which the number is below the threshold is adopted.
3. In regards to the number of bits which do not match the unique word, the quality of communication is judged in accordance with the number of mismatched bits in the detected unique word with the actual unique word.
4. In the case of CRC error detection, if a CRC function has been provided and an error has been detected in the message area of an access channel in which the unique word has been detected, that access channel is discarded, while if no error is detected the access channel is adopted.
5. In the case of pseudo-error pulses, if a pseudo-error pulse generator has been provided, the quality of communication is judged in accordance with the number of pseudo-error pulses counted in the access channel in which the unique word was detected. Alternatively, a threshold is provided and if the number of pseudo-error pulses exceeds the threshold the access channel is discarded, while if the number of pseudo-error pulses is below the threshold the channel is adopted.

Thus the access channel candidate with the best communication quality is selected by mutually comparing a plurality of access channel candidates. If there are many access channel candidates, the number of candidates is reduced prior to their mutual comparison by comparing the candidates with a preset threshold.

Figure 13:
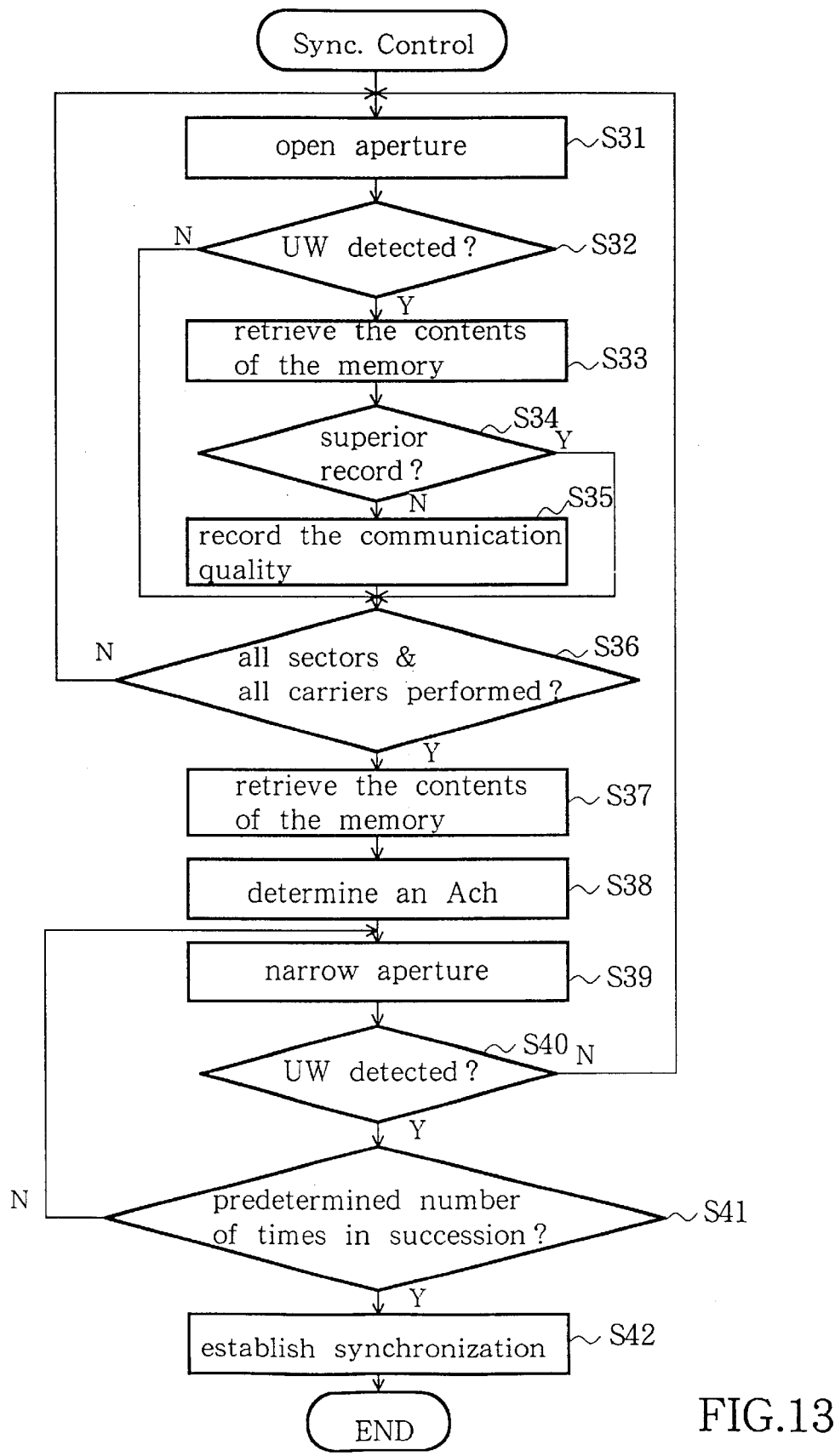
FIG. 13 is a flowchart of a further example of synchronization control.

The synchronization control illustrated in FIG. 13 is also the same as the one shown in FIG. 11 up to the point where the open aperture unique word detection begins (S31, S32). When a radio terminal has detected a unique word on the basis of the open aperture processing, its communication quality is recorded along with its timing and sector information, but in this example the contents of the memory are retrieved first (S33). At this point, the communication quality of the access channel candidate for which a unique word has been detected by the current application of the open aperture processing is recorded along with the timing and sector information only if it is superior to the communication quality of an access channel candidate previously recorded in the memory, and this recording is performed by updating the memory contents.

Namely, the contents of the memory are retrieved (S33) and if there is no superior record (S34), the communication quality of the present candidate is recorded in memory along with the timing and sector information (S35).

This open aperture processing is performed while switching among all the sectors and all the radio carrier frequencies (S36). When open aperture processing has been completed for all the access channels, the contents of the memory are retrieved (S37). At this point in the processing, only the record for a single access channel remains in the memory, whereby an access channel is determined (S38). Subsequent operations are the same as in the example shown in FIG. 11 (S39 to S42).

Because the synchronization control shown in FIG. 13 can dispense with the procedure of selecting one of a plurality of access channel candidates after the open aperture processing has been completed, it can achieve faster processing speeds than the example shown in FIG. 12. However, if the narrow aperture based unique word detection fails for the single access channel recorded in the memory, then because there is no other candidate, the processing has to be repeated starting from the first step.

Figure 14:
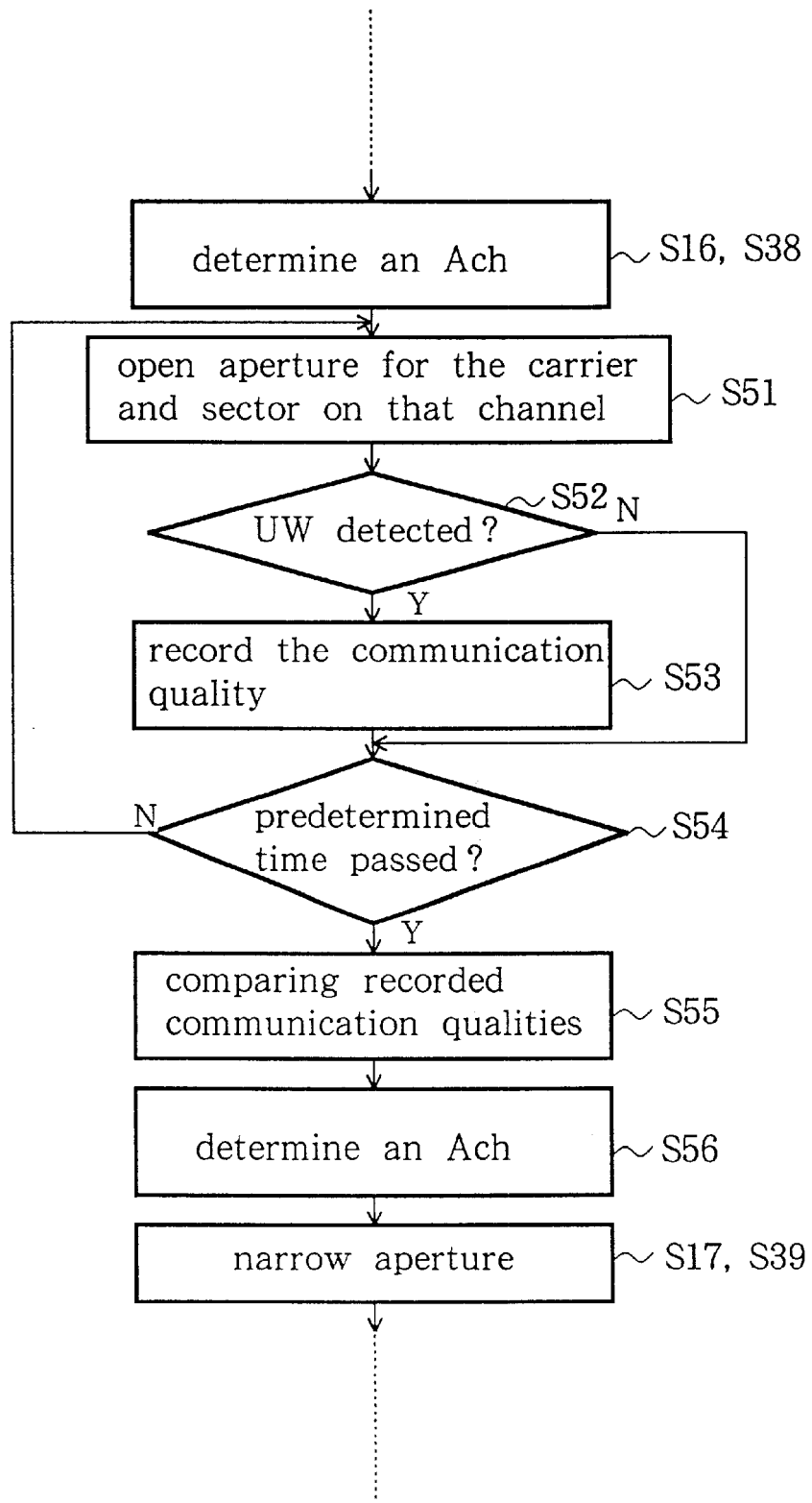
FIG. 14 is a flowchart of an example of selection control.

FIG. 14 shows an example of the operation of selection control, which is executed as steps inserted in the synchronization control shown in FIG. 12 and FIG. 13.

In the synchronization control shown in FIG. 12 and FIG. 13, when an access channel has been determined (S16 or S38), because the open aperture processing has been performed on a plurality of access channel candidates in the prior steps, it is thought that an access channel candidate on which open aperture processing was performed in the early stages will have drifted with the elapse of time from the recorded timing. The unique word might not be able to be detected in the narrow aperture processing because of difference between base station clock and terminal clock.

Accordingly, after the access channel has been determined, the open aperture processing is performed again for the radio carrier frequency and sector where this channel was located (S51). If a unique word is detected in the access channel (S52), the communication quality of this access channel is recorded in the memory (S53). These steps S51 to S53 are repeated for a same time as the previous open aperture processing (S54). After the predetermined time has elapsed, the transmission qualities recorded in the memory for the access channel candidates detected by the open aperture processing are compared (S55). The access channel candidate with the best communication quality is taken as the access channel (S56). The processing then shifts to the narrow aperture unique word detection (S17 or S39).

Figure 15:
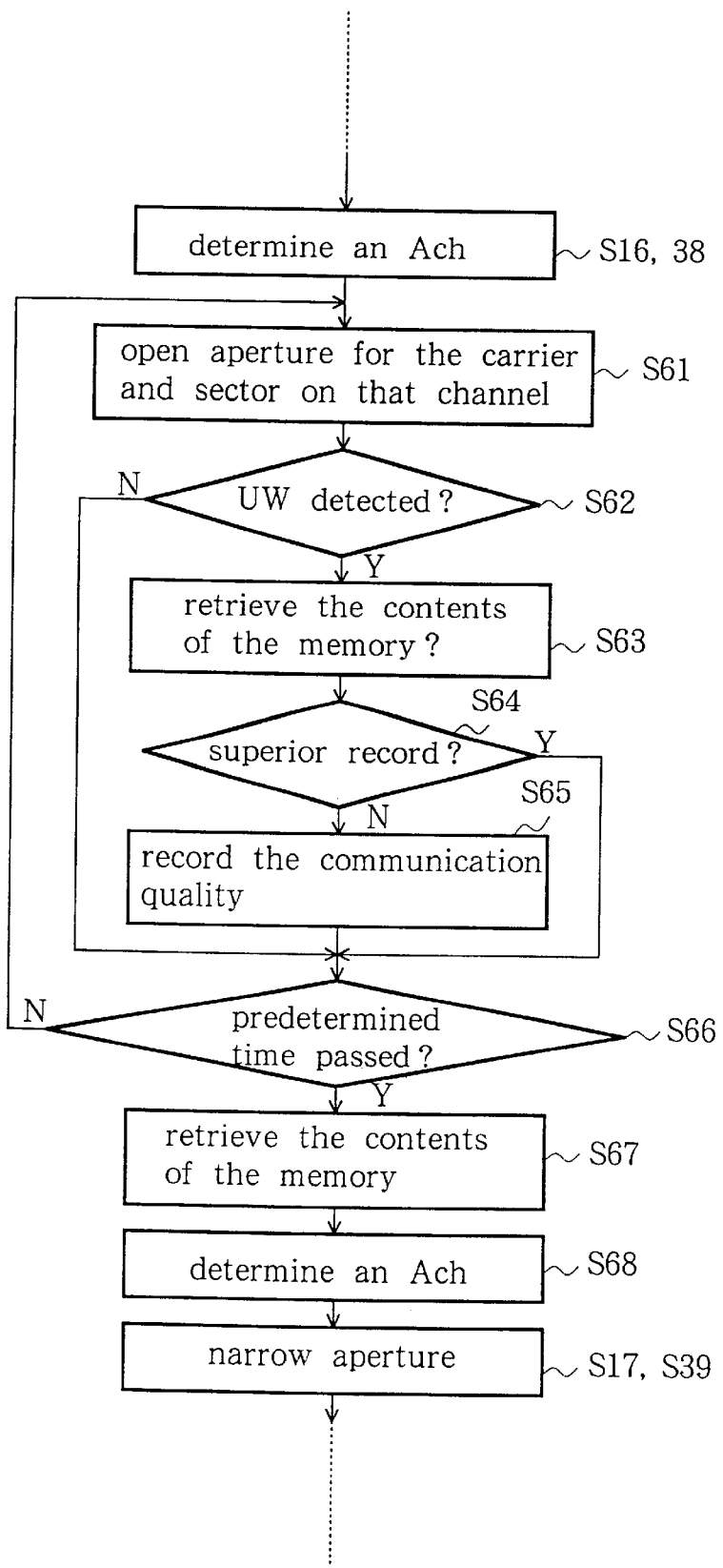
FIG. 15 is a flowchart of another example of selection control.

FIG. 15 gives another example of the operation of selection control. Once the access channel has been determined (S16 or S38), this selection control performs open aperture unique word detection for the frequency and sector where this channel was located (S61). If a unique word is detected (S62), the contents of the memory are retrieved (S63) and if there is no superior record (S64), this communication quality is recorded in the memory along with timing and sector information (S65). Open aperture unique word detection is performed until a predetermined time has elapsed (S66), and when this processing is finished the contents of the memory are retrieved (S67). At this point in the processing, only a record for a single access channel remains in the memory, whereby the access channel is determined (S68). The processing then shifts to the narrow aperture unique word detection (S17 or S39).

As a result, narrow aperture processing can be performed reliably on a desired access channel even after the open aperture processing has been applied to a large number of access channels. The control shown in FIG. 14 or FIG. 15 is particularly useful when inserted in the process flow explained in FIG. 12, where due to there being a step of comparing communication quality for a plurality of access channels, processing takes longer than in the process flow shown in FIG. 13. Again, in the flow illustrated in FIG. 13, because only the best access channel candidate is recorded, if the narrow aperture based synchronization is unsuccessful it becomes necessary to repeat the flow starting from the beginning. Consequently, the probability that narrow aperture synchronization will be unsuccessful can be reduced by implementing the method shown in FIG. 14 or FIG. 15.

As has been explained above, the present invention enables a radio terminal to perform the same control during synchronization, communication and so forth, regardless of the configuration of the radio base station antenna. The configuration of a radio terminal and its communication control can therefore be simplified. As a result, because rapid communication is possible, good spectral efficiency can be achieved. Moreover, a terminal device can select, rapidly and reliably, the channel with the best communication quality from a plurality of access channels, with the result that it is possible to achieve good spectral efficiency and high transmission quality mobile communications.

What is claimed is:

1. A radio channel control method comprising:
   providing a predetermined number of antenna elements at a radio base station to transmit and receive an access channel to and from a radio terminal in each frame of information, wherein predetermined number of antenna elements are more than one;
   switching said antenna elements at each said frame; and
   setting an antenna element ID in a specific functional relation to an access channel ID;
   wherein the radio terminal which communicates with the radio base station transmits and receives in accordance with the access channel ID without the antenna element ID via the same antenna element for each access channel ID.

2. A radio channel control method according to claim 1, wherein the access channel ID is an integer which cycles from 0 to N−1, and the number of the antenna elements is a divisor of N.

3. A radio channel control method according to claim 2, wherein respective access channel IDs are given to uplink and downlink access channels, and the functional relation to the respective acess channel IDs are identical and their cycling phase of access channel IDs are different.

4. A wireless access system comprising:
   a radio terminal; and
   a radio base station which is connectable to said radio terminal by time division multiple access (TDMA), said radio base station including:
      a predetermined number of antenna elements, wherein predetermined number of antenna elements are more than one;
      means for transmitting and receiving an access channel in each frame of information; and
      means for letting the access channel ID be a and the antenna element ID be s, and setting:

$$s = f(a)$$

where f indicates a specific functional relation for each one of said predetermined number of antenna elements;

wherein the radio terminal comprises a means for communicating with said radio base station in accordance with said access channel ID a and said radio station transmitting and receiving via one of the antenna elements for each said access channel ID a.

5. A wireless access system according to claim 4, wherein said radio base station includes a plurality of antennas, and a diversity means operatively provided for said plurality of antennas.

6. A wireless access system according to claim 4, wherein the radio terminal comprises:

- a sector antenna having a plurality of azimuths including a transmitting and receiving azimuth which is switched among said plurality of azimuths at each said frame;
- means for switching a transmit and receive frequency every time the sectors of said sector antenna are switched through a complete cycle;
- an open aperture means for successively seeing for a unique word in the received signal at all times; and
- a synchronizing means for, when the unique word has been detected by said open aperture means, subsequently attempting to confirm synchronization a predetermined number of times.

7. A wireless access system according to claim 6, wherein the radio terminal includes a means for randomly switching a transmit and receive frequency until said synchronization is established.

8. A wireless access system according to claim 6, wherein the radio terminal includes a selection means for, even if the unique word is detected by the open aperture means, deferring establishing said synchronization until it has cycled through all the combinations of antenna sector and transmit and receive frequencies, and for establishing said synchronization for the combination which provides the best received or transmitted signal quality during the cycling.

9. A wireless access system according to claim 8, wherein the selection means includes a means for recording the communication quality of each of the combinations.

10. A wireless access system according to claim 8, wherein the selection means includes a means for recording the combination which provides the best transmission quality.

11. A wireless access system according to claim 8, wherein the selection means comprises means for determining the access channel in accordance with the contents recorded by a recording means, and for performing open aperture processing for the access channel.

12. A wireless access system according to claim 9, wherein the selection means comprises means for determining the access channel in accordance with the contents recorded by a recording means, and for performing open aperture processing for the access channel.

13. A wireless access system according to claim 10, wherein the selection means comprises means for determining the access channel in accordance with the contents recorded by a recording means, and for performing open aperture processing for the access channel.

* * * * *